United States Patent
Tamura et al.

(10) Patent No.: US 7,720,512 B2
(45) Date of Patent: May 18, 2010

(54) METHOD FOR CONTROLLING A HANDS-FREE SYSTEM, RADIO APPARATUS, AND HANDS FREE APPARATUS

(75) Inventors: Toshiya Tamura, Tokyo (JP); Kentaro Nagahama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 951 days.

(21) Appl. No.: 10/954,493

(22) Filed: Oct. 1, 2004

(65) Prior Publication Data
US 2005/0113149 A1 May 26, 2005

(30) Foreign Application Priority Data
Apr. 7, 2004 (JP) ............ P2004-113012

(51) Int. Cl.
*H04M 1/00* (2006.01)
*H04B 1/38* (2006.01)
*H04B 7/15* (2006.01)

(52) U.S. Cl. ............ 455/569.1; 455/11.1; 455/556.1; 455/557; 455/567; 455/569.2

(58) Field of Classification Search .......... 455/569.1, 455/11.1, 556.1, 557, 567, 569.2
See application file for complete search history.

(56) References Cited

U.S. PATENT DOCUMENTS

| | | | | |
|---|---|---|---|---|
| 4,881,259 A | * | 11/1989 | Scordato ............ | 455/412.2 |
| 5,878,354 A | * | 3/1999 | Hasegawa ............ | 455/567 |
| 5,960,367 A | * | 9/1999 | Kita ............ | 455/567 |
| 5,966,656 A | * | 10/1999 | Elkin et al. ............ | 455/421 |
| 6,216,017 B1 | * | 4/2001 | Lee et al. ............ | 455/567 |
| 6,807,433 B2 | * | 10/2004 | Oota et al. ............ | 455/566 |
| 7,016,707 B2 | * | 3/2006 | Fujisawa et al. ............ | 455/567 |
| 7,110,801 B2 | * | 9/2006 | Nassimi ............ | 455/575.2 |

(Continued)

FOREIGN PATENT DOCUMENTS

EP    1 401 179 A2    3/2004

(Continued)

OTHER PUBLICATIONS

Notification of Reasons for Rejection issued by the Japanese Patent Office on Aug. 18, 2006, in Japanese Patent Application No. 2004-113012, and English-language translation thereof.

(Continued)

*Primary Examiner*—Matthew D Anderson
*Assistant Examiner*—Bobbak Safaipour
(74) *Attorney, Agent, or Firm*—Finnegan, Henderson, Farabow, Garrett & Dunner, L.L.P.

(57) ABSTRACT

With a conventional hands-free system formed by a radio apparatus and a hands-free apparatus connectable to each other by a local radio link, accepting a call on the hands-free apparatus is ineffective after the radio apparatus starts to send a reply message. There is provided a method for hands-free control to solve this problem. The method comprises measuring time since transferring a call arrived at the radio apparatus to the hands-free apparatus, and establishing a voice channel on the local radio link in a case where an operation is done to accept the call on the hands-free apparatus while the reply message is being sent.

4 Claims, 9 Drawing Sheets

U.S. PATENT DOCUMENTS

| | | | |
|---|---|---|---|
| 7,174,192 B2 * | 2/2007 | Nagahama | 455/569.1 |
| 2002/0042281 A1 * | 4/2002 | Tsukamoto | 455/462 |
| 2003/0045235 A1 * | 3/2003 | Mooney et al. | 455/41 |
| 2004/0185915 A1 * | 9/2004 | Ihara et al. | 455/569.1 |
| 2004/0203357 A1 * | 10/2004 | Nassimi | 455/41.1 |
| 2005/0227741 A1 | 10/2005 | Nagahama | |
| 2006/0135214 A1 * | 6/2006 | Zhang et al. | 455/569.1 |

FOREIGN PATENT DOCUMENTS

| | | |
|---|---|---|
| JP | 64-11452 | 1/1989 |
| JP | 8-125745 | 5/1996 |
| JP | 11 004190 | 1/1999 |
| JP | 2003-51896 | 2/2003 |
| WO | WO 99/60765 | 11/1999 |
| WO | WO 00/19688 | 4/2000 |
| WO | WO 03/106222 A1 | 12/2003 |

OTHER PUBLICATIONS

European Search Report dated Jul. 25, 2005, for European Application No. 04255964.1.

Bluetooth SIG, "Hands-Free Profile Adopted Version 1.0", pp. 1-73, (Apr. 29, 2003).

* cited by examiner

METHOD FOR CONTROLLING A HANDS-FREE SYSTEM, RADIO APPARATUS, AND HANDS FREE APPARATUS

CROSS REFERENCE TO RELATED APPLICATIONS

This application is based upon and claims the benefit of priority from the prior Japanese Patent Application No. 2004-113012 filed on Apr. 7, 2004; the entire contents of which are incorporated herein by reference.

FIELD OF THE INVENTION

The present invention relates to a method for controlling a hands-free system, a radio apparatus, and a hands-free apparatus.

DESCRIPTION OF THE BACKGROUND

Radio communications are now widely used, including on moving vehicles or in any busy situations. Hands-free systems are used for such kinds of radio communications to assure traffic safety or any kind of conveniences. A hands-free system is formed by a radio apparatus, e.g., a cellular phone, and a hands-free apparatus.

A radio apparatus and a hands-free apparatus are linked to each other by a local radio link to form a hands-free system, provided that they are capable of sending and receiving radio signals through the link. Examples of such a local radio link are Bluetooth (TM) and a wireless local area network (WLAN), and particularly in the Bluetooth specifications there is provided a standardized hands-free profile to support such kinds of applications.

Here is assumed a hands-free system formed by a radio apparatus and a hands-free apparatus. The hands-free apparatus has a microphone, a loud speaker, and an operation panel. The hands-free apparatus is connectable to the radio apparatus by a local radio link, and the radio apparatus may be set normal, i.e., to be used while being held by a human hand, or hands-free. When the radio apparatus is set hands-free, a control channel is established on the local radio link.

The radio apparatus is used as an ending node of a communication network. An incoming phone call received at the radio apparatus is transferred to the hands-free apparatus through the control channel. The call may be accepted on the hands-free apparatus, i.e., by operating the operation panel thereof. When the call is accepted on the hands-free apparatus, a voice channel is established on the local radio link to enable a voice communication in a hands-free manner, using the microphone and the loud speaker of the hands-free apparatus.

When a call arrives at the radio apparatus from another ending node of the communication network, i.e., the other party on the phone, the call is transferred from the radio apparatus to the hands-free apparatus through the control channel. If the call is not accepted on the hands-free apparatus during a predetermined time period, the radio apparatus reads out a reply message, like "Sorry, I am not available for the time being", stored in a built-in memory and sends the reply message to the other party, as one of usual functions of radio apparatuses.

Accepting the call on the hands-free apparatus is usually ineffective after sending the reply message begins. That is inconvenient, in a case where an operation to accept the call has to be delayed due to an instantaneous traffic situation or some other reasons although such an operation has been intended.

Vehicular phone systems were improved to alleviate a danger when a call arrives at a radio apparatus included in the system, and the improved systems are disclosed in the Japanese published patent applications, e.g., H11-4190 and 2003-51896, the English versions of which are available on the Japan Patent Office website.

The former one of those conventional systems determines if the vehicle is moving or not, when a call from another party arrives at the radio apparatus, based on the velocity data obtained by a velocity measurement unit on board. When it is determined that the vehicle is moving, a reply message is sent back, saying that the call cannot be accepted since the vehicle is moving, and a spoken message of the other party is recorded, if any.

The latter one sends a reply message to the other party including vehicular status in addition to the information if it is moving or not at the time when the call arrives at the radio apparatus. That may help not to receive repetitive calls from the other party, who understands the vehicular status well due to the contents of the reply message.

These conventional techniques, however, do not solve the problem that accepting the call on the hands-free apparatus is ineffective after sending a reply message begins.

SUMMARY OF THE INVENTION

To solve the technical problem described above, an advantage of the present invention is to provide a method for controlling a hands-free system that enables accepting a call by operating the hands-free apparatus, even after sending a reply message begins.

According to one aspect of the present invention to achieve the above advantage, there is provided a method for controlling a hands-free system formed by a radio apparatus and a hands-free apparatus connectable to each other by a local radio link. The radio apparatus is configured to be a first ending node of a communication network, and to have a memory. The hands-free apparatus is configured to enable an operation to accept a call thereon.

The method for hands-free control comprises establishing a control channel on the local radio link, receiving a call at the radio apparatus, the call being sent by a second ending node of the communication network, sending the call from the radio apparatus to the hands-free apparatus through the control channel, measuring time on the radio apparatus after sending the call to the hands-free apparatus, starting to send a reply message read out of the memory to the second ending node, in a case where a period of the measured time reaches a predetermined time period while the call is not accept on the hands-free apparatus, establishing a voice channel on the local radio link in a case where the call is accepted on the hands-free apparatus before a period of the measured time reaches the predetermined time period, or in a case where the call is accepted on the hands-free apparatus while the reply message is being sent, and conducting a hands-free voice communication between the second ending node and the hands-free system, after establishing the voice channel.

DETAILED DESCRIPTION OF THE INVENTION

Figure 1:
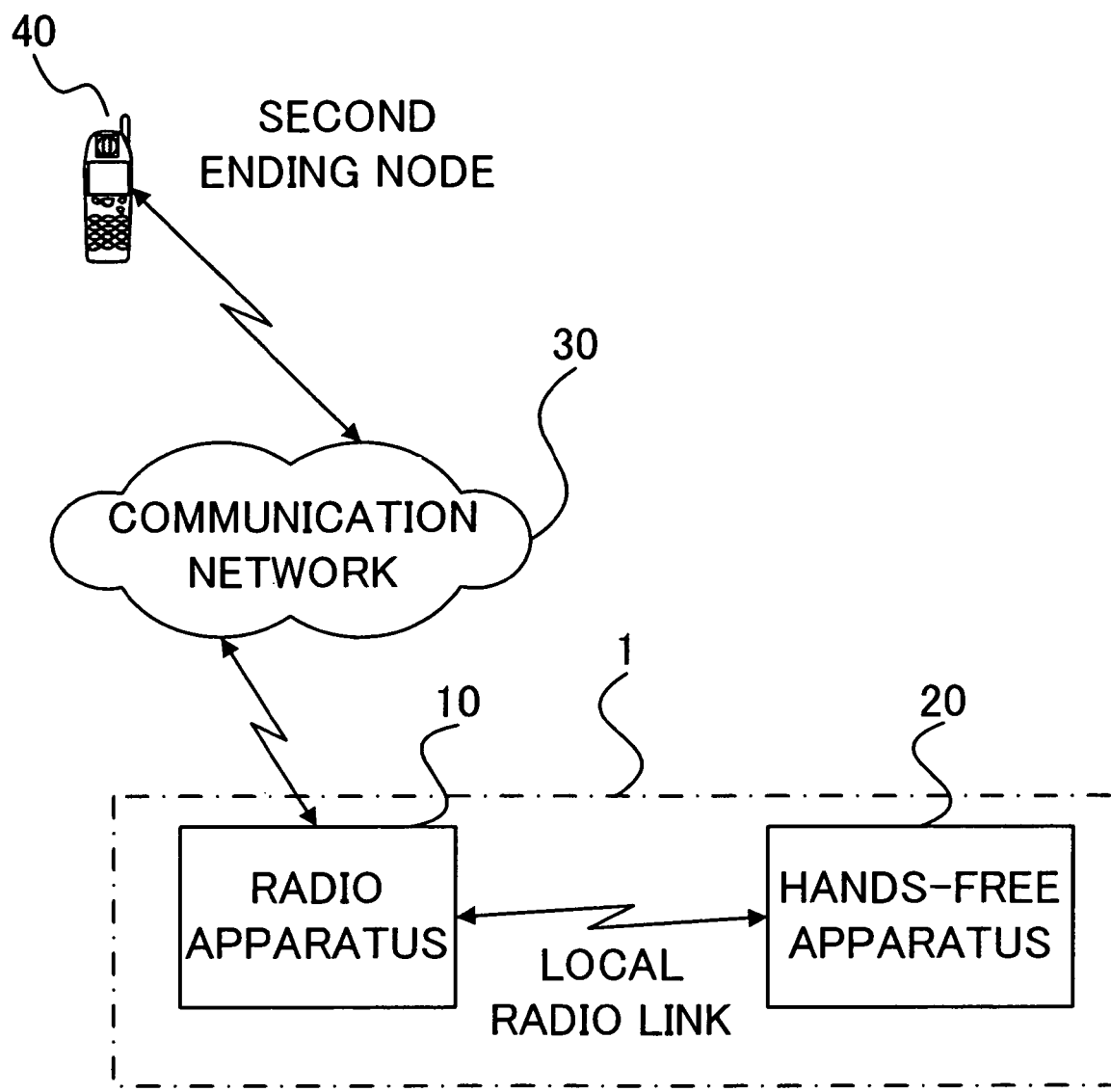
FIG. 1 is a block diagram of a first embodiment of a hands-free system of the present invention.

A first embodiment of the present invention will be described with reference to FIG. 1 through FIG. 3. FIG. 1 is a block diagram of a hands-free system of the first embodiment.

The hands-free system 1 is formed by a radio apparatus 10 and a hands-free apparatus 20. The radio apparatus 10 is used as a first ending node of a communication network 30. A second ending node 40 is connected to the communication network 30. An example of the second ending node 40 is, though not limited to, a cellular phone. The radio apparatus 10 and the hands-free apparatus 20 are connectable to each other by a local radio link, e.g., Bluetooth (TM) or WLAN. The radio apparatus 10 may be set either normal, i.e., to be used being held by a human hand, or hands-free.

The hands-free apparatus 20 has, e.g., a panel on which an operation is performed to accept a call sent from other ending nodes including the second ending node 40, and transferred from the radio apparatus 10 being set hands-free. The panel may be physically or virtually (e.g., on a screen) implemented. The hands-free apparatus 20 has, e.g., a microphone and a loud speaker to enable voice inputs and outputs in a hands-free manner.

Figure 2:
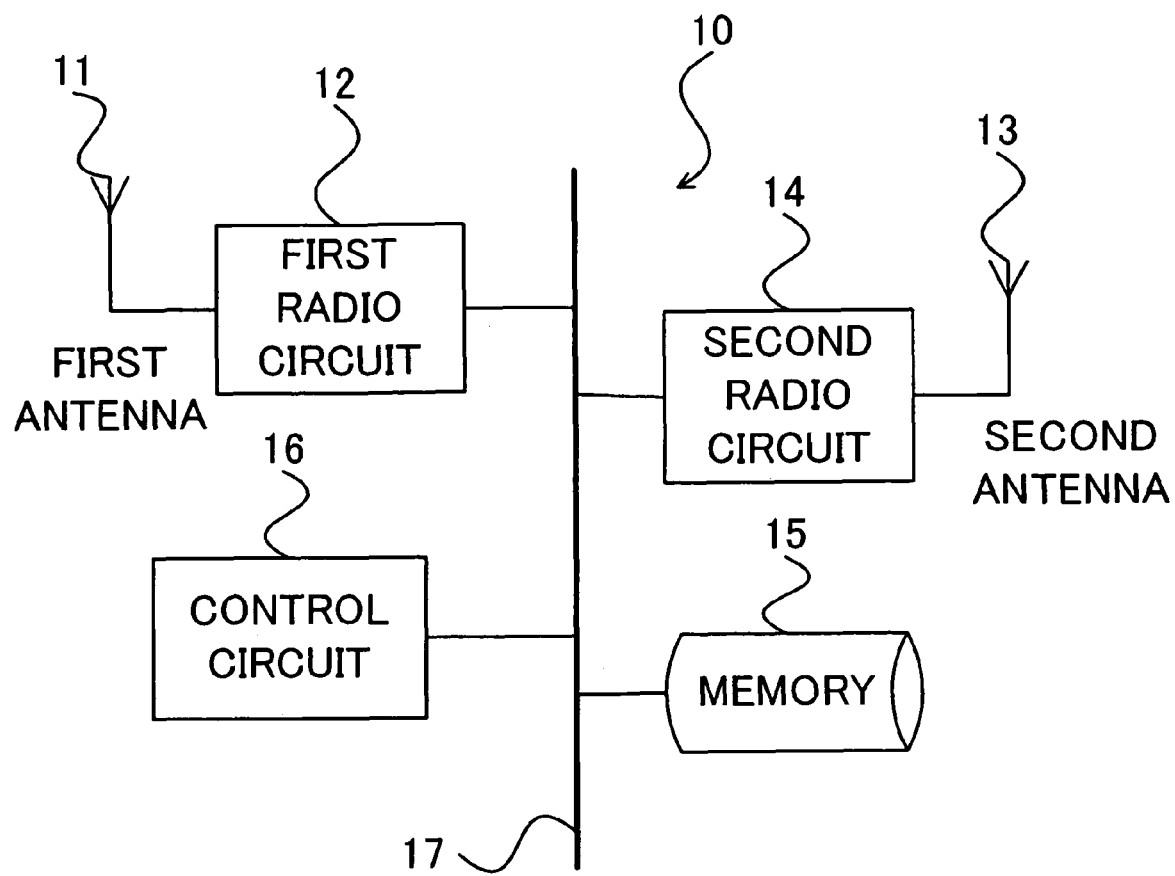
FIG. 2 is a block diagram of a main part of a radio apparatus of the first embodiment.

FIG. 2 is a block diagram of a main part of the radio apparatus 10 shown in FIG. 1. The radio apparatus 10 has a first antenna 11 used for sending and receiving radio signals to and from the communication network 30 (more precisely a radio station belonging thereto). Those radio signals carry data and voice conveyed by the communication network 30.

The first antenna 11 is connected to a first radio circuit 12 that performs transmission of radio signals including coding, modulation, amplification, and so on, and reception of radio signals including amplification, demodulation, decoding, and so on.

The radio apparatus 10 has a second antenna 13 used for sending and receiving local radio signals to and from the hands-free apparatus 20. Those local radio signals carry data through a control channel established on the local radio link, and carry voice through a voice channel established on the local radio link.

The second antenna 13 is connected to a second radio circuit 14 that performs transmission of local radio signals including coding, modulation, amplification, and so on, and reception of local radio signals including amplification, demodulation, decoding, and so on.

The radio apparatus 10 has a memory 15 on which stored is a reply message. The reply message is, e.g., "Sorry, I am not available for the time being, such and such".

The radio apparatus 10 has a control circuit 16 that is connected to the first radio circuit 12, the second radio circuit 14, and the memory 15 via a common bus 17. The control circuit 16 is, e.g., a microprocessor unit or a digital signal processor, and performs a hands-free control of the first embodiment.

A method for controlling the hands-free system 1 of the first embodiment will be described with reference to FIG. 3, which is a diagram of a processing sequence and signal flows among the second ending node 40, the radio apparatus 10, and the hands-free apparatus 20 of the first embodiment.

The control circuit 16 exchanges data necessary to establish a control channel with the hands-free apparatus 20, according to a specified protocol of the local radio link. Local radio signals carrying those data are sent to and received at the second radio circuit 14 and the second antenna 13. As the result a control channel is established on the local radio link (Step "S1"). The control circuit 16 sets the radio apparatus 10 hands-free and waits for a call arriving from any other ending node of the communication network 30.

The control circuit 16 receives a call sent by the second ending node 40 and conveyed by the communication network 30, with the first antenna 11 and the first radio circuit 12 (Step "S2"). The control circuit 16 sends the call to the hands-free apparatus 20 through the control channel, with the second radio circuit 14 and the second antenna 13 (Step "S3").

The control circuit 16 measures time after sending the call to the hands-free apparatus 20 (Step "S4"). The hands-free apparatus 20 requests the radio apparatus 10 to establish a voice channel on the local radio link, through the control channel, when the call is accepted on the hands-free apparatus 20. The control circuit 16 is thereby aware if the call has been accepted on the hands-free apparatus 20 or not.

When a period of the measured time reaches a predetermined time period while the call is not accepted on the hands-free apparatus 20 ("YES" of Step "S5"), the control circuit 16 reads the reply message out of the memory 15, and starts to send the reply message to the second ending node (Step "S6", or "ARM STARTING", where "ARM" stands for an automatic reply message), with the first radio circuit 12 and the first antenna 11.

While the reply message is being sent (Step "S7"), the call has been neither accepted nor rejected yet. When the call is accepted on the hands-free apparatus 20 in the meantime ("YES" of Step "S8"), the control circuit 16 receives a request to establish a voice channel, and is aware that the call has been accepted on the hands-free apparatus 20, as described above.

The control circuit 16 exchanges data necessary to establish a voice channel with the hands-free apparatus 20, according to a specified protocol of the local radio link. Local radio signals carrying those data are sent and received with the second radio circuit 14 and the second antenna 13. As the result a voice channel is established (Step "S9").

Once the voice channel is established on the local radio link, the control circuit 16 receives incoming voice messages from the second ending node 40 with the first antenna 11 and the first radio circuit 12, and transfers to the hands-free apparatus 20 through the voice channel with the second radio circuit 14 and the second antenna 13. The control circuit 16 receives outgoing voice messages from the hands-free apparatus and sends to the second ending node 40 vice versa. A hands-free voice communication is thus conducted between the second ending node 40 and the hands-free system 1 (Step "S10").

When the call is accepted on the hands-free apparatus 20 before the measured time reaches the predetermined time period ("NO" of Step "S5"), the hands-free apparatus 20 and the radio apparatus 10 establish the voice channel (Step "S9") as described above. This sequence goes through a circled "A" as illustrated in FIG. 3.

When the call is not accepted on the hands-free apparatus 20 before sending the reply message ends ("NO" of Step "S8"), the control circuit 16 rejects the call and goes back to the status of waiting for an arriving call before Step "S2". This sequence goes through a circled "B" as illustrated in FIG. 3.

A spoken message sent from the second ending node 40 may be recorded and stored on the memory 15 before rejecting the call, in a case where the reply message includes inviting to leave a message.

The radio apparatus 10 may be set normal before the call is accepted on the hands-free apparatus 20. A normal voice communication is conducted while the radio apparatus 10 is being held by a human hand in such a case.

According to the first embodiment described above, accepting a call on the hands-free apparatus is allowed not only before starting to send the reply message but also while it is being sent. This advantage makes hands-free systems more convenient and user-friendly than conventional ones.

A second embodiment of the present invention will be described with reference to FIG. 4. FIG. 1 and FIG. 2 will also be referenced as a hands-free system of the second embodiment has the same configuration as the one of the first embodiment shown in FIG. 1 and FIG. 2.

The same reference numerals given to the apparatuses, components or units in these figures will be used in the following description, and a detailed explanation of them is omitted. A ringing sound is stored on the memory 15 in addition to the reply message described in the first embodiment.

Figure 4:
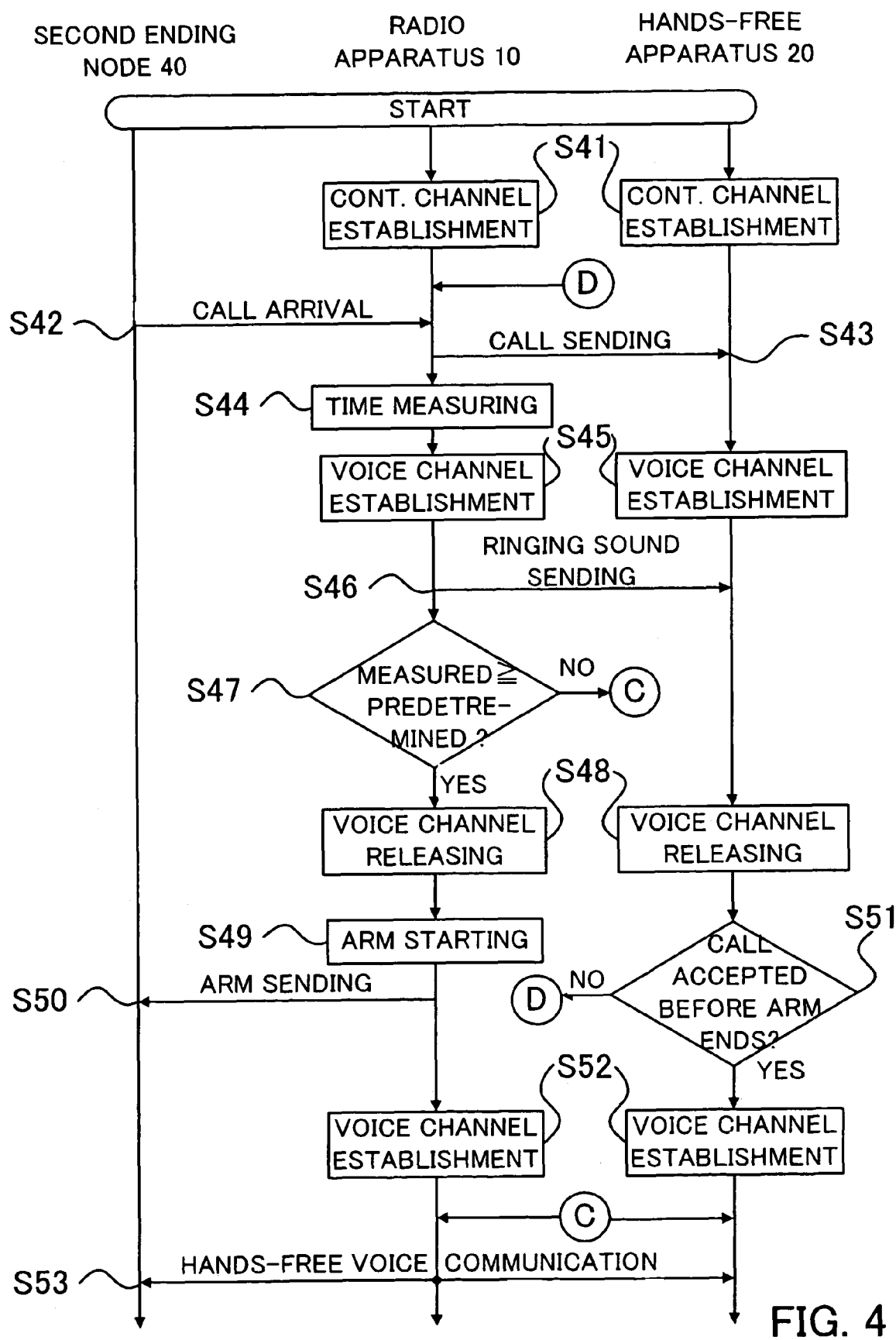
FIG. 4 is a diagram of a processing sequence and signal flows of a second embodiment of a method for controlling a hands-free system of the present invention.

FIG. 4 is a diagram of a processing sequence and signal flows among the second ending node 40, the radio apparatus 10, and the hands-free apparatus 20 of the second embodiment.

Figure 3:
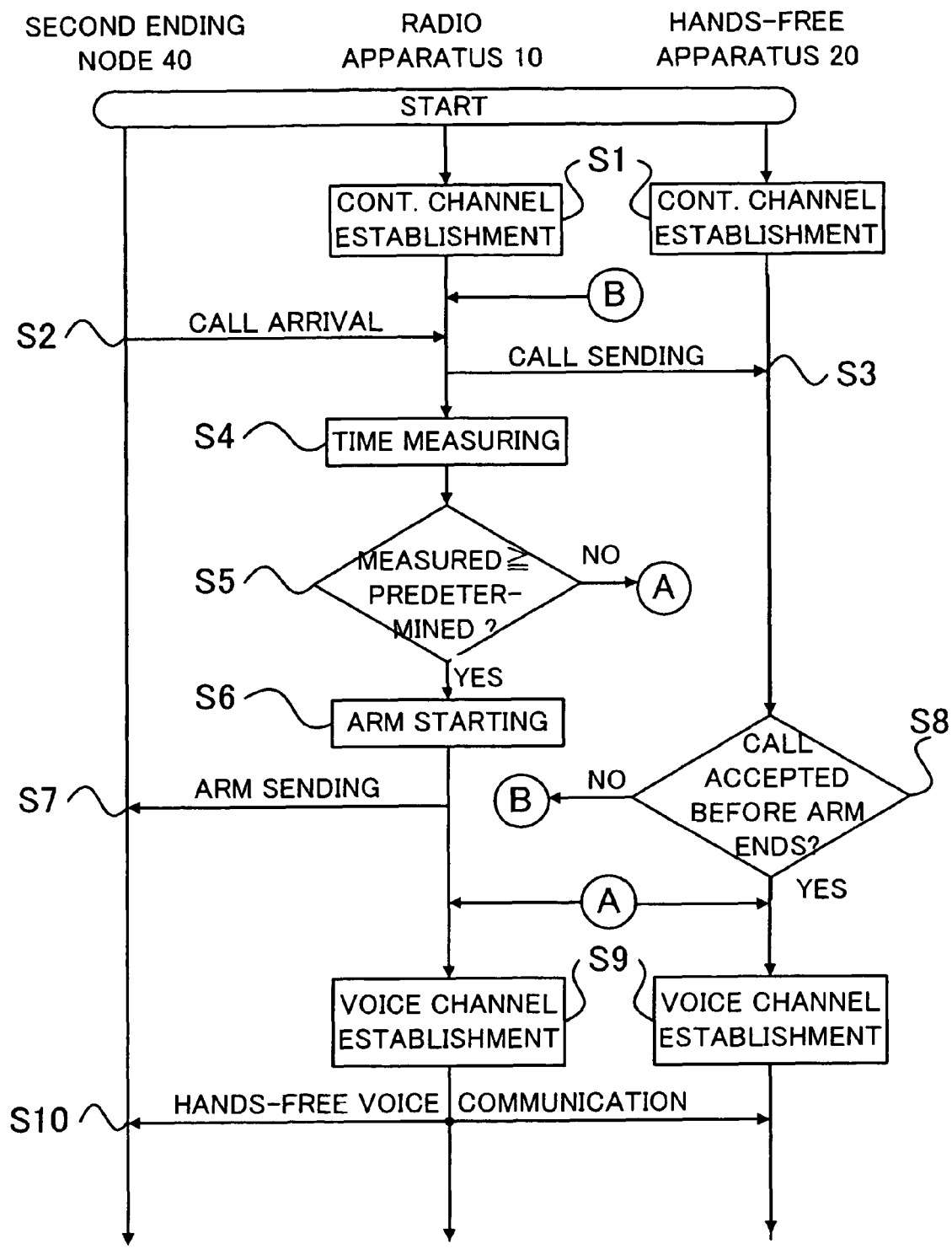
FIG. 3 is a diagram of a processing sequence and signal flows of the first embodiment of a method for controlling a hands-free system of the present invention.

Establishing a control channel on the local radio link (Step "S41"), receiving a call at the radio apparatus 10 (Step "S42"), sending the call to the hands-free apparatus (Step "S43"), and measuring time (Step "S44") are identical to Steps "S1", "S2", "S3", and "S4", respectively, in FIG. 3, and a detailed explanation of these steps is omitted.

While measuring time (Step "S44"), the control circuit 16 exchanges data necessary to establish a voice channel in advance according to a specified protocol, with the hands-free apparatus 20, and establish the voice channel on the local radio link (Step "S45"). The voice channel established in advance is identical to the voice channel in the first embodiment, and is used to transfer sounds as well as voice messages.

The control circuit 16 reads the ringing sound out of the memory 15, and sends the sound to the hands-free apparatus 20 through the voice channel, with the second radio circuit 14 and the second antenna 13 (Step "S46"). The hands-free apparatus 20 rings by reproducing the sound, e.g., from the loud speaker.

When a period of the measured time reaches a predetermined time period while the call is not accepted on the hands-free apparatus ("YES" of Step "S47"), the control circuit 16 releases the voice channel with the hands-free apparatus 20 (Step "S48"). Then the control circuit 16 reads the reply message out of the memory 15, and starts to send the reply message to the second ending node 40 (Step "S49") as at Step "S6" in FIG. 3.

Sending the reply message (Step "S50"), accepting the call on the hands-free apparatus 20 (Step "S51"), establishing the voice channel (Step "S52"), and conducting a hands-free voice communication (Step "S53") are identical to Steps "S7", "S8", "S9", and "S10", respectively, in FIG. 3, and a detailed explanation of these steps is omitted. It should be noted, though, that Step "S52" is re-establishing the voice channel in the second embodiment.

When the call is accepted on the hands-free apparatus 20 before the measured time reaches the predetermined time period ("NO" of Step "S47"), the sequence goes through a circled "C" as illustrated in FIG. 4, and a detailed explanation of which will be described later as another embodiment of the present invention.

When the call is not accepted before sending the reply message ends ("NO" of Step "S51"), the control circuit 16 rejects the call and goes back to the status of waiting for an arriving call before Step "S42". This sequence goes through a circled "D" as illustrated in FIG. 4.

According to the second embodiment described above, the hands free-apparatus informs of the call arrival by ringing. This advantage helps an earlier acknowledgement of a call arrival and enables a smoother hands-free voice communication.

A third embodiment of the present invention will be described with reference to FIG. 5. FIG. 1 and FIG. 2 will also be referenced as a hands-free system of the third embodiment has the same configuration as the one of the first embodiment shown in FIG. 1 and FIG. 2.

The same reference numerals given to the apparatuses, components or units in these figures will be used in the following description, and a detailed explanation of them is omitted. A ringing sound is stored on the memory 15 as in the second embodiment.

Figure 5:
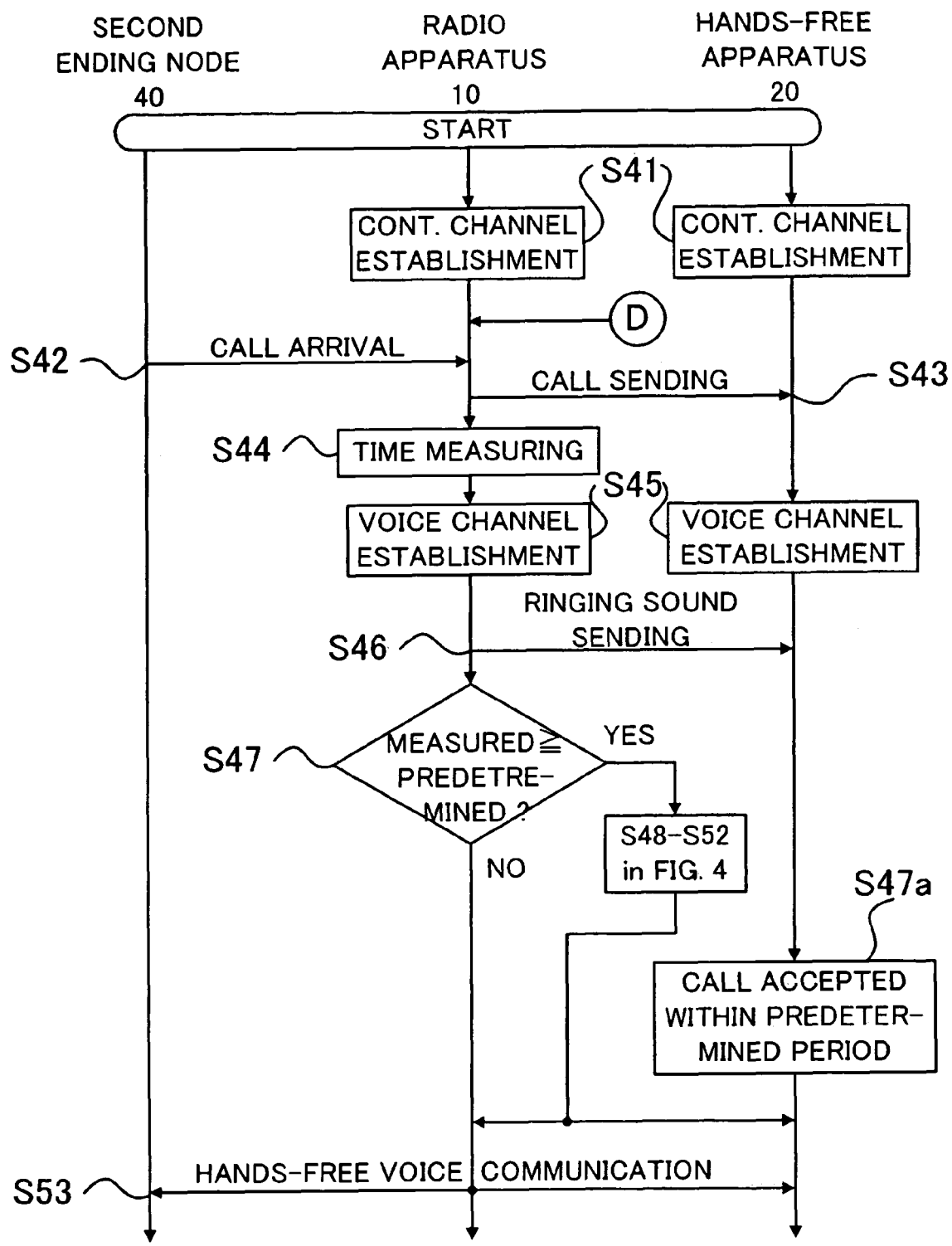
FIG. 5 is a diagram of a processing sequence and signal flows of a third embodiment of a method for controlling a hands-free system of the present invention.

FIG. 5 is a diagram of a processing sequence and signal flows among the second ending node 40, the radio apparatus 10, and the hands-free apparatus 20 of the third embodiment. Steps "S41" through "S47" are the same as in FIG. 4, and that is why the same reference names are given to these steps, a detailed explanation of which is omitted.

When the call is accepted on the hands-free apparatus 20 before the measured time reaches the predetermined time period ("NO" of Step "S47", and Step "S47a"), the hands-free apparatus 20 and the radio apparatus 10 maintain the voice channel established at Step "S45" and conduct the hands-free voice communication of Step "S53" using the voice channel.

When a period of the measured time reaches a predetermined time period while the call is not accepted on the hands-free apparatus ("YES" of Step "S47"), the sequence follows Steps "S48" through "S52" in FIG. 4, as described in the second embodiment.

According to the third embodiment described above, the voice channel is not released and is used to transfer voice messages between the radio apparatus and the hands-free apparatus, thus simplifying the sequence in a case where the call is accepted within the predetermined period.

A fourth embodiment of the present invention will now be described with reference to FIG. 6 and FIG. 7. FIG. 1 will also be referenced since a hands-free system in the fourth embodiment has the same configuration as the one in the first embodiment shown in FIG. 1. The same reference numerals given to the apparatuses, components or circuits in these figures will be used in the following description, and a detailed explanation of these is omitted.

Figure 6:
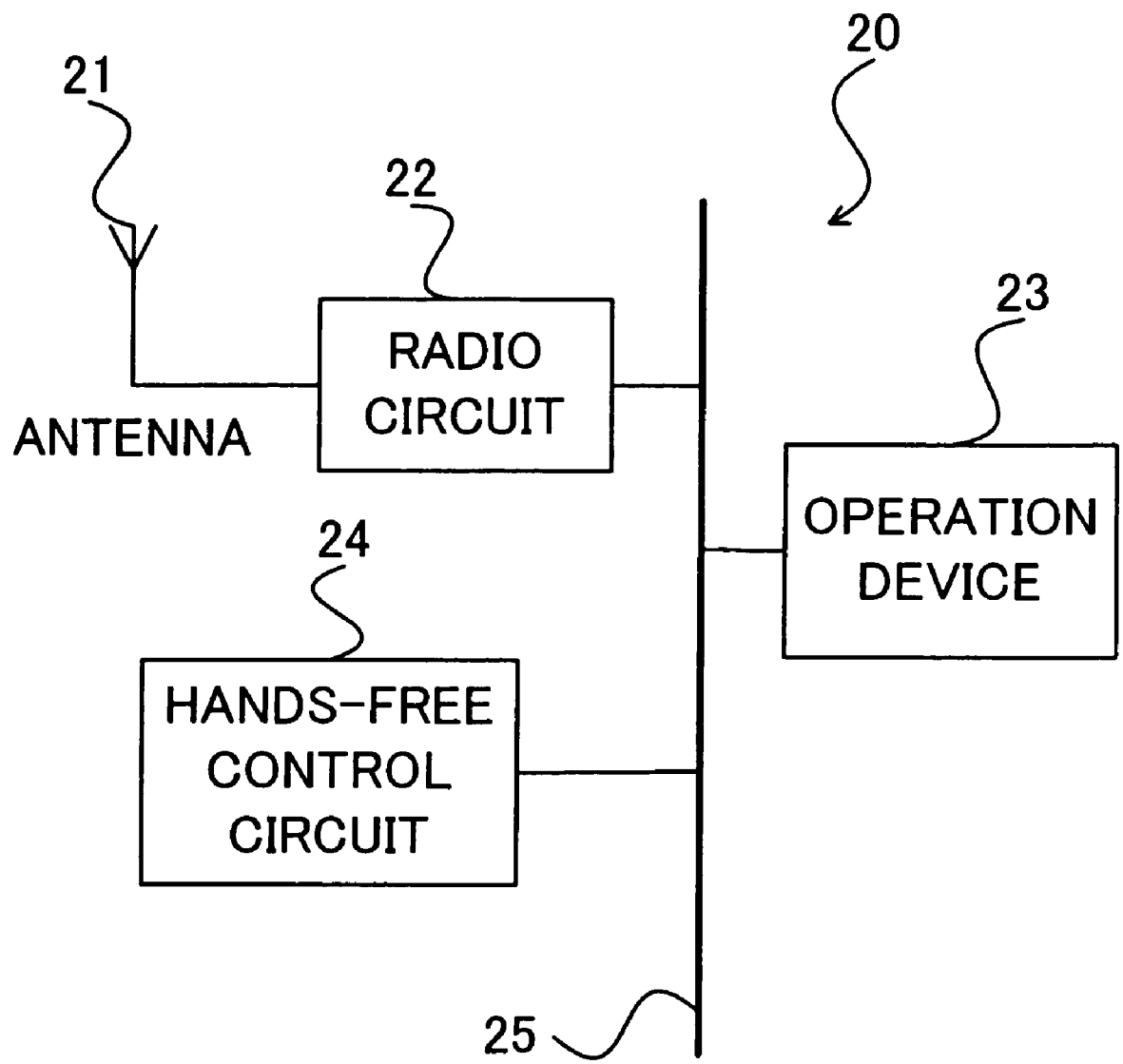
FIG. 6 is a block diagram of a fourth embodiment of a hands-free apparatus of the present invention.
Figure 7:
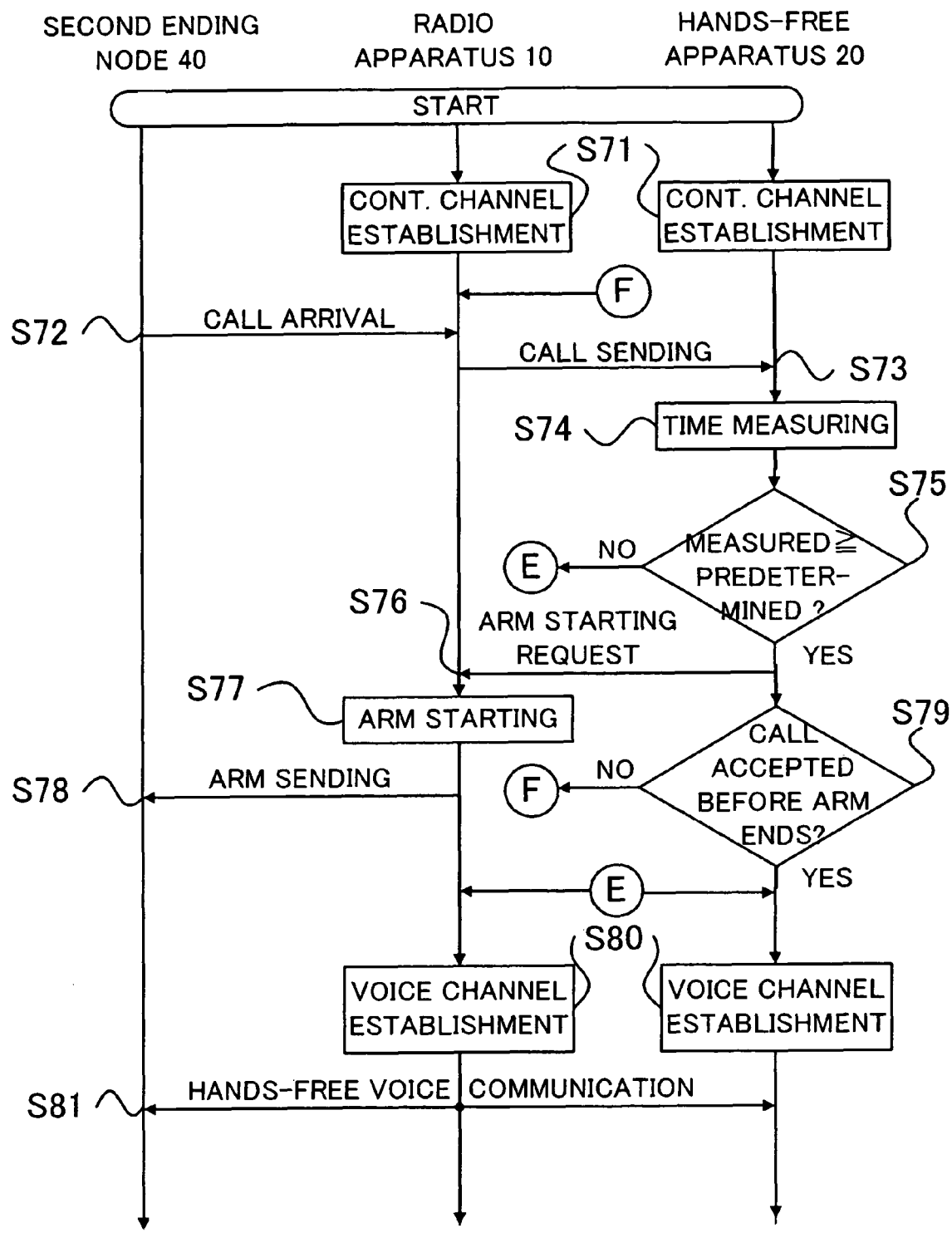
FIG. 7 is a diagram of a processing sequence and signal flows of the fourth embodiment of a method for controlling a hands-free system of the present invention.

FIG. 6 is a block diagram of a hands-free apparatus 20 of the fourth embodiment. The hands-free apparatus 20 has an antenna 21 used for sending and receiving local radio signals to and from the radio apparatus 10. These local radio signals carry data through a control channel established on the local radio link, and carry voice through a voice channel established on the local radio link.

The antenna 21 is connected to a radio circuit 22 that performs transmission of local radio signals including coding, modulation, amplification, and so on, and reception of local radio signals including amplification, demodulation, decoding, and so on.

The hands-free apparatus 20 has an operation device 23 that is, e.g., a panel physically or virtually (e.g., on a screen) implemented, on which an operation is performed to accept a call from other ending nodes including the second ending node 40. The hands-free apparatus 20 has, e.g., a microphone and a loud speaker (both are not shown) to enable voice inputs and outputs in a hands-free manner.

The hands-free apparatus 20 has a hands-free control circuit 24 that is connected to the radio circuit 22 and the operation device 23 via a common bus 25.

The hands-free apparatus 20 sends and receives local radio signals to and from the radio apparatus 10 with the radio circuit 22 and the antenna 21, and has the radio apparatus 10 send and receive radio signals to and from the communication network 30, as controlled by the hands-free control circuit 24. A sequence including such sending and receiving will be described later. The hands-free control circuit 24 is, e.g., a microprocessor or a digital signal processor, and performs a hands-free control of the fourth embodiment.

A method for controlling the hands-free system 1 in the fourth embodiment will be described with reference to FIG. 7, which is a diagram of a processing sequence and signal flows among the second ending node 40, the radio apparatus 10, and the hands-free apparatus 20 in the fourth embodiment.

The hands-free apparatus 20 exchanges data necessary to establish a control channel with the radio apparatus 10, according to a specified protocol of the local radio link. Local radio signals carrying these data are sent and received with the radio circuit 22 and the antenna 21. As the result a control channel is established on the local radio link (Step "S71"). The radio apparatus 10 sets itself hands-free as described in the first embodiment.

The radio apparatus 10 receives a call sent by the second ending node 40 and conveyed by the communication network 30 (Step "S72"), and transfers the call to the hands-free apparatus 20 through the control channel (Step "S73"). The hands-free apparatus 20 receives the call with the antenna 21 and the radio circuit 22.

The hands-free control circuit 24 measures time after receiving the call (Step "S74"). When a period of the measured time reaches a predetermined time period while the call is not accepted with the operation device 23 ("YES" of Step "S75"), the hands-free control circuit requests the radio apparatus 10 to start to send a reply message to the second ending node 40 (Step "S76"). The radio apparatus 10 then reads the reply message out of its memory and starts to send (Step "S77").

While the reply message is being sent (Step "S78"), the call has been neither accepted nor rejected yet. When the call is accepted with the operation device 23 in the meantime ("YES" of Step "S79"), the hands-free control circuit 24 exchanges data necessary to establish a voice channel with the radio apparatus 10, according to a specified protocol of the local radio link. Local radio signals carrying those data are sent and received with the radio circuit 22 and the antenna 21. As the result a voice channel is established (Step "S80").

Once the voice channel is established on the local radio link, a hands-free voice communication is conducted between the second ending node 40 and the hands-free system 1 (Step "S81") as described in the first embodiment.

When the call is accepted with the operation device 23 before the measured time reaches the predetermined time period ("NO" of Step "S75"), the hands-free apparatus 20 and the radio apparatus 10 establish the voice channel (Step "S80") as described above. This sequence goes through a circled "E" as illustrated in FIG. 3.

When the call is not accepted with the operation device 23 before sending the reply message ends ("NO" of Step "S79"), the hands-free control circuit 24 requests the radio apparatus 10 to reject the call and goes back to the status of waiting for an arriving call before Step "S72". This sequence goes through a circled "F" as illustrated in FIG. 7.

According to the fourth embodiment described above, the hands-free system may be controlled by the hands-free apparatus and obtains the same effect as in the first embodiment.

A fifth embodiment of the present invention will now be described with reference to FIG. 8. FIG. 1 and FIG. 6 will also be referenced as a hands-free system in the fifth embodiment has the same configuration as the one in the fourth embodiment shown in FIG. 1 and FIG. 6. The same reference numerals given to the apparatuses, components or circuits in these figures will be used in the following description, and a detailed explanation of these is omitted.

Figure 8:
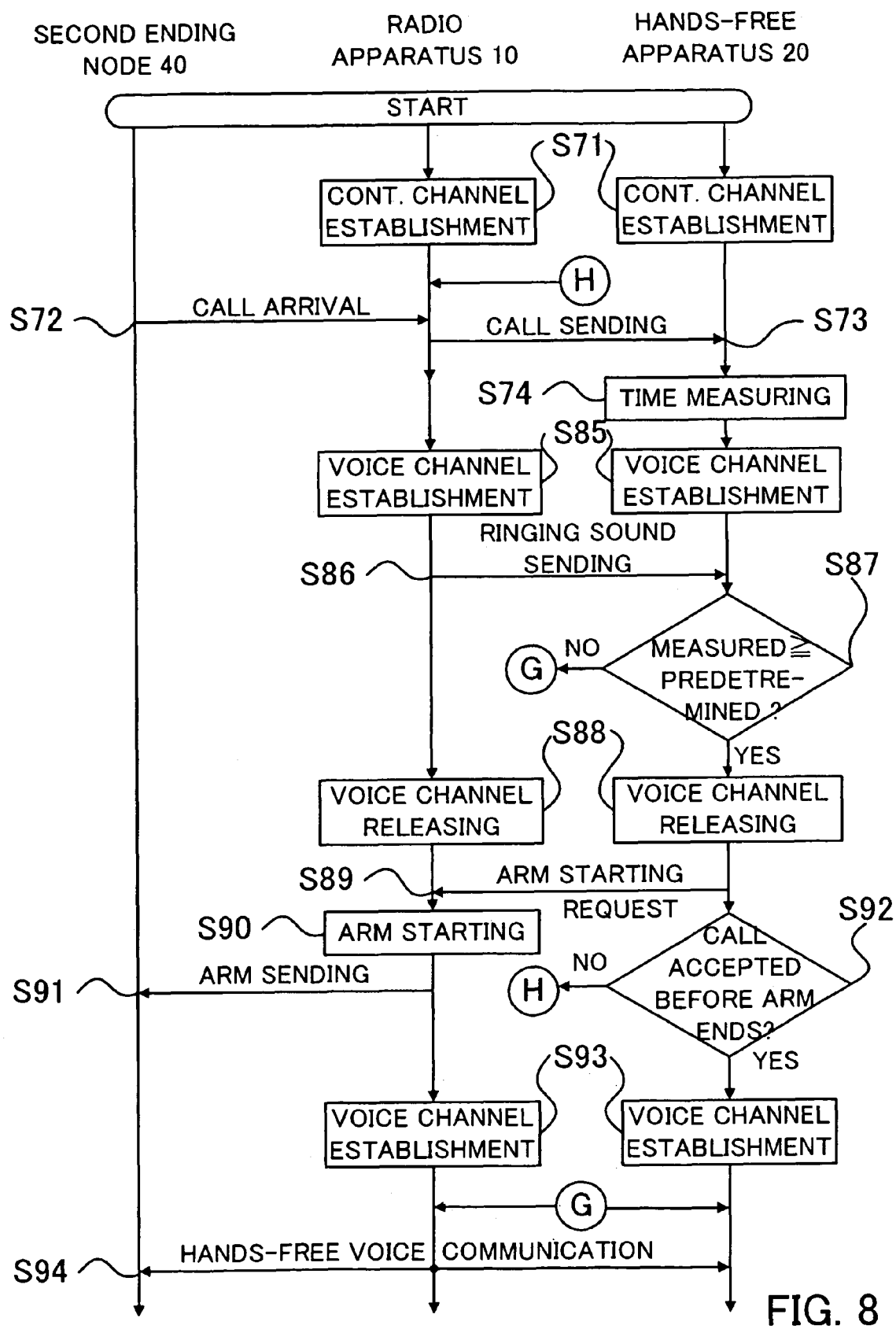
FIG. 8 is a diagram of a processing sequence and signal flows of a fifth embodiment of a method for controlling a hands-free system of the present invention.

FIG. 8 is a diagram of a processing sequence and signal flows among the second ending node 40, the radio apparatus 10, and the hands-free apparatus 20 of the fifth embodiment. Steps "S71" through "S74" are the same as those in FIG. 7, and a detailed explanation of these steps is omitted.

While measuring time (Step "S74"), the hands-free control circuit 24 exchanges data necessary to establish a voice channel in advance according to a specified protocol, with the radio apparatus 10, and establish the voice channel on the local radio link (Step "S85"). The voice channel established in advance is identical to the voice channel in the fourth embodiment, and is used to transfer sounds as well as voice messages.

The radio apparatus 10 sends a ringing sound read out of its memory through the voice channel to the hands-free apparatus 20 (Step "S86"). The ringing sound is received by the antenna 21 and the radio circuit 22, and the hands-free control circuit controls reproducing the ringing sound by, e.g., driving the loud speaker.

When a period of the measured time reaches a predetermined time period while the call is not accepted with the operation device 23 ("YES" of Step "S87"), the hands-free control circuit 24 releases the voice channel with the radio apparatus 10 (Step "S88"). Then the hands-free control circuit 24 requests the radio apparatus 10 to start to send a reply message to the second ending node 40 (Step "S89"). The radio apparatus 10 then reads the reply message out of its memory and starts to send (Step "S90").

The following Steps "S91", "YES" of "S92", "S93" and "S94" are identical to the Steps "S78", "YES" of "S79", "S80" and "S81", respectively, and a detailed explanation of these is omitted.

When the call is accepted with the operation device 23 before the measured time reaches the predetermined time period ("NO" of Step "S87"), the sequence goes through a circled "G" as illustrated in FIG. 8, and a detailed explanation of which will be described later as another embodiment of the present invention.

When the call is not accepted with the operation device 23 before sending the reply message ends ("NO" of Step "S92"), the hands-free control circuit 24 requests the radio apparatus 10 to reject the call and goes back to the status of waiting for an arriving call before Step "S72". This sequence goes through a circled "H" as illustrated in FIG. 8.

According to the fifth embodiment described above, the hands-free system may be controlled by the hands-free apparatus and obtains the same effect as in the second embodiment.

A sixth embodiment of the present invention will now be described with reference to FIG. 9. FIG. 1 and FIG. 6 will also be referenced since a hands-free system in the sixth embodiment has the same configuration as the one in the fourth embodiment shown in FIG. 1 and FIG. 6. The same reference numerals given to the apparatuses, components or circuits in these figures will be used in the following description, and a detailed explanation of these is omitted.

Figure 9:
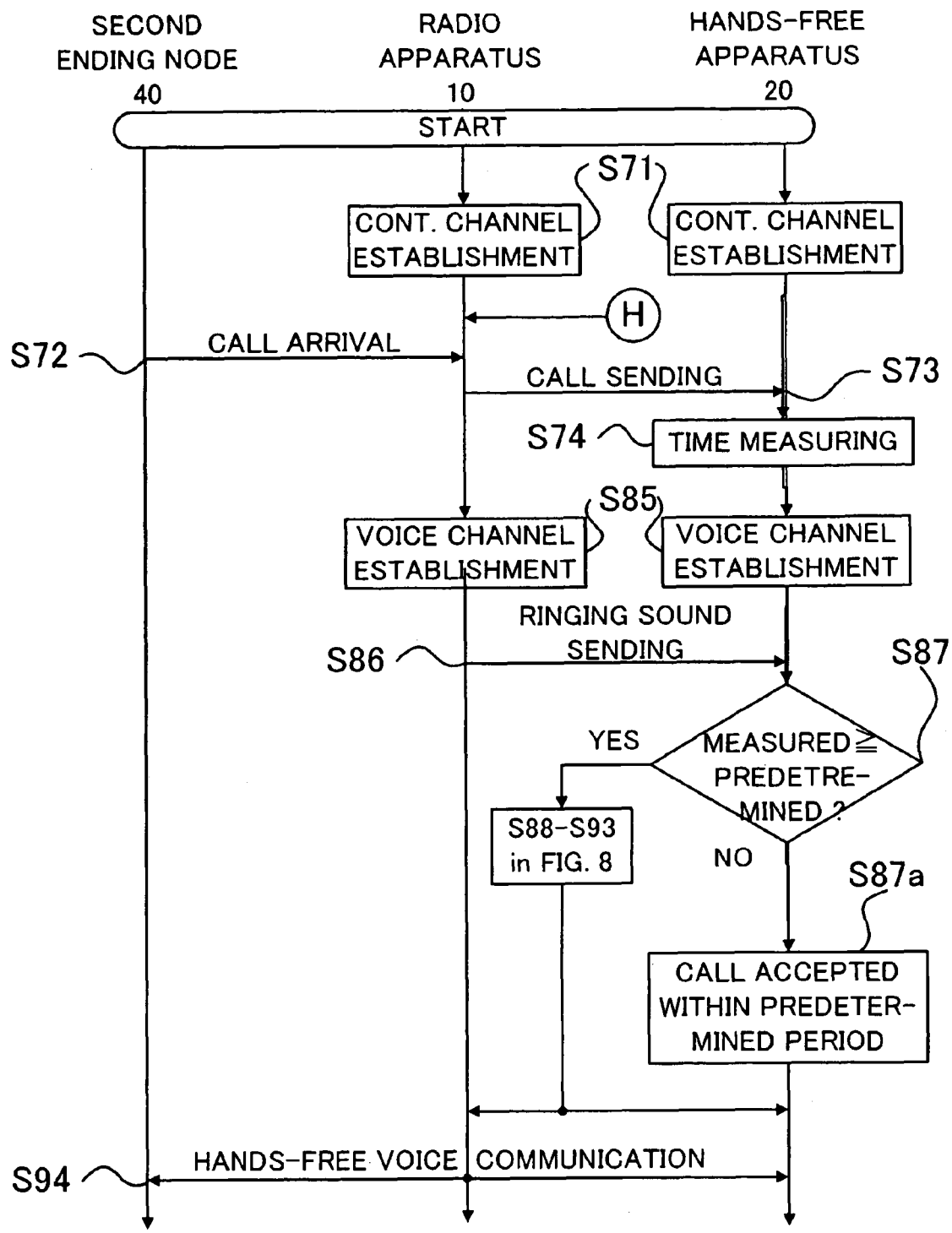
FIG. 9 is a diagram of a processing sequence and signal flows of a sixth embodiment of a method for controlling a hands-free system of the present invention.

FIG. 9 is a diagram of a processing sequence and signal flows among the second ending node 40, the radio apparatus 10, and the hands-free apparatus 20 of the third embodiment. Steps "S71" through "S74", "S85", "S86", "YES" of "S87", "S88" through "S93" and "S94" are the same as those in FIG. 8, and a detailed explanation of these steps is omitted.

When the call is accepted with the operation device 23 before the measured time reaches the predetermined time period ("NO" of Step "S87", and Step "S87a"), the hands-free apparatus 20 and the radio apparatus 10 maintain the voice channel established at Step "S85" and conduct the hands-free voice communication of Step "S94" using the voice channel.

According to the sixth embodiment described above, the hands-free system may be controlled by the hands-free apparatus and obtains the same effect as in the third embodiment.

The particular hardware or software implementation of the present invention may be varied while still remaining within the scope of the present invention. It is therefore to be understood that within the scope of the appended claims and their equivalents, the invention may be practiced otherwise than as specifically described herein.

We claim:

1. A radio apparatus connectable to a radio station via a first antenna and connectable to a hands-free apparatus via a second antenna, comprising:
a first radio circuit configured to send and receive radio signals to and from the radio station via the first antenna;
a second radio circuit configured to send and receive radio signals to and from the hands-free apparatus via the second antenna; and
a controller configured to control the radio apparatus,
wherein the controller is configured to execute:
establishing a control channel with the hands-free apparatus via the second radio circuit and the second antenna, and switching to hands-free mode;
sending an incoming call to the hands-free apparatus through the control channel if the incoming call is detected while the hands-free mode is set;
measuring time to respond to the incoming call;
activating a voice recording function automatically, so that a caller can leave a message, if the measured time reaches a predetermined time period and no signal for replying to the incoming call is received from the hands-free apparatus via the control channel, and waiting for the hands-free apparatus to reply via the control channel;
establishing a voice channel with the hands-free apparatus via the second radio circuit and the second antenna if a signal for replying to the incoming call is received from the hands-free apparatus via the control channel while the voice recording function is activated; and
transferring a voice from the radio station to the hands-free apparatus and a voice from the hands-free apparatus to the radio station if the voice channel is established.

2. The radio apparatus according to claim 1, further comprising:
a memory configured to store a reply message for prompting a caller to leave a voice message;
wherein, the controller sends the reply message to the radio station via the first radio circuit and the first antenna after replying to the incoming call automatically.

3. A radio apparatus connectable to a radio station via a first antenna and connectable to a hands-free apparatus via a second antenna, comprising:
a memory configured to store a ring sound to be used for informing a callee of a reception of an incoming call;
a first radio circuit configured to send and receive radio signals to and from the radio station via the first antenna;
a second radio circuit configured to send and receive a radio signal to and from the hands-free apparatus via the second antenna; and
a controller configured to control the radio apparatus,
wherein, the controller is configured to execute:
establishing a control channel with the hands-free apparatus via the second radio circuit and the second antenna, and switching to a hands-free mode;
sending an incoming call to the hands-free apparatus through the control channel if the incoming call is detected while the hands-free mode is set;
measuring time to respond to the incoming call;
establishing a voice channel with the hands-free apparatus via the second radio circuit and the second antenna responding to the incoming call;
sending the ring sound stored in the memory to the hands-free apparatus via the voice channel;
releasing the voice channel with the hands-free apparatus if the measured time reaches a predetermined time period and no signal for replying to the incoming call is received from the hands-free apparatus via the control channel;
activating a voice recording function automatically, so that a caller can leave a message, if the measured time reaches the predetermined time period and no signal for replying to the incoming call is received from the hands-free apparatus via the control channel, and waiting for the hands-free apparatus to reply via the control channel;
re-establishing the voice channel with the hands-free apparatus if a signal for replying to the incoming call is received from the hands-free apparatus via the control channel while the voice recording function is being activated; and
enabling a hands-free communication between the hands-free apparatus and a caller apparatus via the radio apparatus if the voice channel is re-established.

4. The radio apparatus according to claim 3, wherein the memory further stores a reply message for prompting a caller to leave the voice message, and the controller sends the reply message to the radio station via the first radio circuit and the first antenna.

* * * * *